Patented June 5, 1951

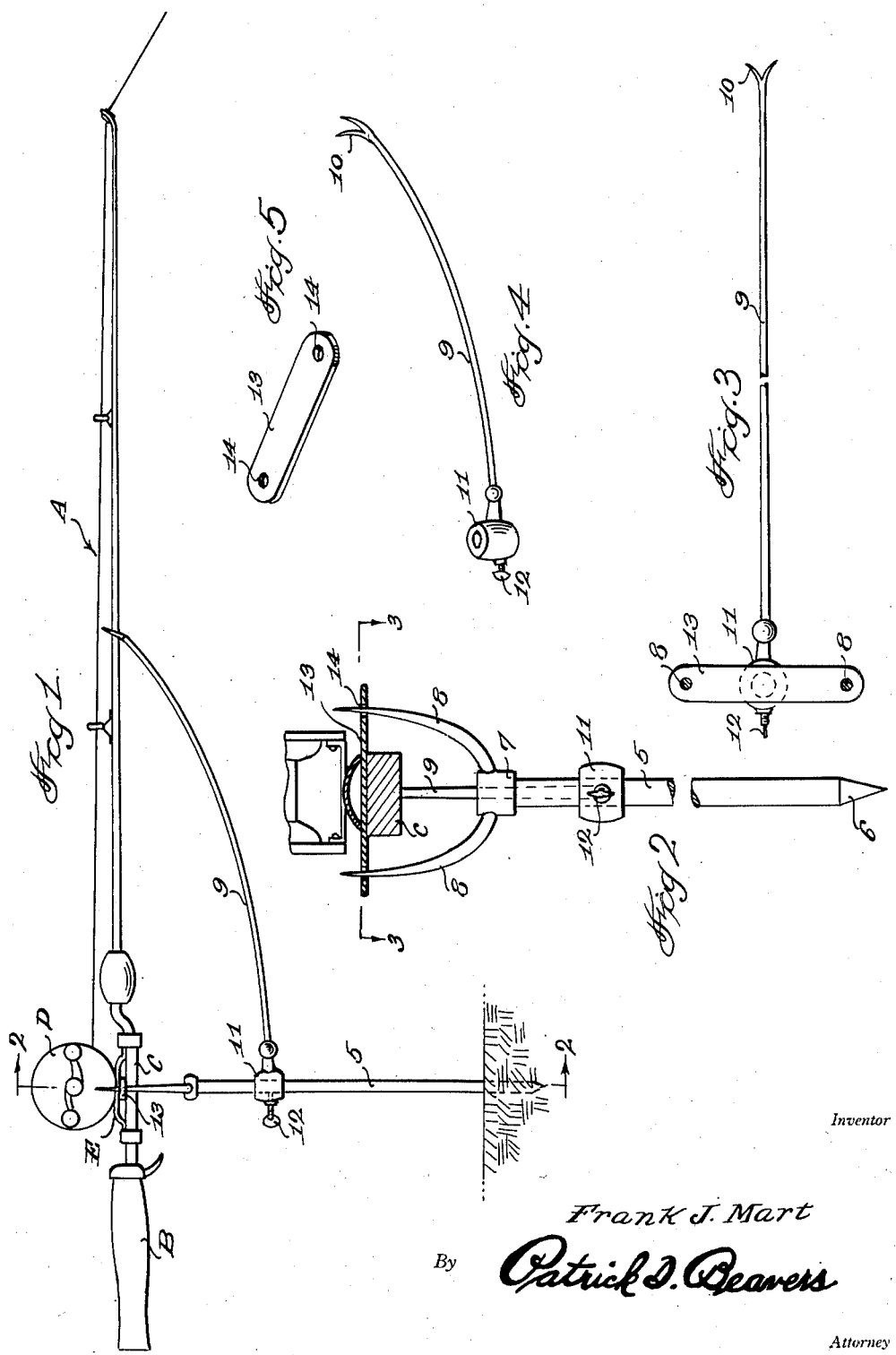

2,555,982

UNITED STATES PATENT OFFICE 2,555,982

FISHING ROD STAND

Frank J. Mart, Steubenville, Ohio

Application August 22, 1949, Serial No. 111,729

1 Claim. (Cl. 248—42)

The present invention relates to improvements and means for supporting fishing rods and more particularly to a stand upon which a fishing rod can be placed and adequately held, while the fisherman is resting or performing other duties.

An important object of the present invention is to provide a fishing rod stand, which can be readily set up for holding a fishing rod in a steady and secure manner, yet permitting the rod and its reel to be removed instantly therefrom, when a strike occurs.

Another object of the invention is to provide a fishing rod stand, or holder upon which a rod and reel can be adequately supported and wherein the structure can be adjusted, so as to tilt the rod, as may be desired under certain wind conditions.

A further object of the invention is to provide a fishing rod stand, which can be readily disassembled and stored in a small space or compartment.

These and various other objects and advantages of the invention will become apparent to the reader of the following description.

In the drawing:

Figure 1 is a side elevational view of the stand, shown supporting a rod and reel;

Figure 2 is a fragmentary vertical sectional view taken substantially on line 2—2 of Figure 1;

Figure 3 is a horizontal sectional view taken substantially on line 3—3 of Figure 2, looking downwardly in the direction of the arrows;

Figure 4 is a perspective view of the arm;

Figure 5 is a perspective view of the supporting plate.

Referring to the drawing, wherein like numerals designate like parts, it can be seen that numeral 5 denotes a substantially heavy stake or rod having a pointed lower end for driven disposition in the ground, as shown in Figure 1, while the upper end is provided with a fork structure consisting of a collar 7, embracing the upper end of the stake 5, and provided with upstanding pointed prongs 8, 8.

Numeral 9 denotes an elongated arcuate arm having an upstanding fork 10 at its outer end, while its inner end is provided with a collar 11 for slidable disposition on the stake 5, and this collar can be held in a set adjusted position by a set screw 12. The set screw being adapted to be driven inwardly to bite the stake 5.

Reference character A denotes a fishing rod having a handle portion B and a reel attaching portion C. Reference character D denotes a conventional fishing reel having a rod attaching base E.

In carrying out the present invention, an elongated plate 13 having openings 14, 14 at the ends thereof is interposed between the reel base E and the reel attaching portion C of the rod A and is held in that position, as shown in Figure 2, by the clamping action of the base E, in clamping the plate against the portion C of the fishing rod.

After the plate 13 has been disposed in position as suggested in Figure 1 and shown in Figure 2, and the collar 11 has been disposed to the correct position on the stake 5 and the stake 5 driven into the ground, the medial portion of the rod A can be placed upon the fork 10, and slid to the desired position, so that by lowering the portion C down over the fork 8, 8, the openings 14, 14 of the plate 13 will receive the upper ends of the prongs 8, and thus the rod and reel will be held steadily, yet permitting its removal from the stand quickly, in the event a fish strikes.

Obviously the parts can be readily taken apart and placed in a small compartment where they can remain stored until future use.

While the foregoing description sets forth the invention in specific terms, it is to be understood that numerous changes in the shape, size and materials may be resorted to, without departing from the spirit and scope of the invention as claimed hereinafter.

Having described the invention, what is claimed as new is:

A fishing rod stand comprising an upright, a laterally disposed arm and means at the upper end of the upright and the outer end of the arm for supporting a fishing rod, said means being in the form of a pair of forks, and a fishing rod carrying plate having openings therein for receiving the prongs of the fork on the upright, said plate being disposed between the rod and reel of a fishing rod.

FRANK J. MART.

REFERENCES CITED

The following references are of record in the file of this patent:

UNITED STATES PATENTS

| Number | Name | Date |
|---|---|---|
| 1,091,491 | Ebur | Mar. 31, 1914 |
| 1,534,642 | Hoagland | Apr. 21, 1925 |
| 1,619,152 | Nunlist | Mar. 1, 1927 |
| 2,484,427 | Schwenk | Oct. 11, 1949 |
| 2,492,323 | Roell | Dec. 27, 1949 |